United States Patent [19]
Bauman et al.

[11] 3,812,710
[45] May 28, 1974

[54] ELECTRONIC FUEL CONSUMPTION METER

[75] Inventors: Günther Bauman, Stuttgart; Peter Schmidt, Schwieberdingen; Hermann Eisele, Ditzingen; Josef Wahl, Stuttgart, all of Germany

[73] Assignee: Robert Bosch GmbH, Stuttgart, Germany

[22] Filed: July 7, 1971

[21] Appl. No.: 160,302

[30] Foreign Application Priority Data
July 9, 1970 Germany............................ 2034067

[52] U.S. Cl............................ 73/114, 73/115
[51] Int. Cl........................ G01l 3/26, G01m 15/00
[58] Field of Search............................ 73/113–117, 73/206; 307/273

[56] References Cited
UNITED STATES PATENTS
2,276,717  2/1939  Codebecq............................ 73/113
2,359,767  10/1944  Keinath............................ 73/113
2,992,640  7/1961  Knapp............................ 307/273 X
3,069,901  12/1962  Freeman et al.............................. 73/114 X
3,181,353  5/1965  Brahm et al.............................. 73/117.3
3,253,459  5/1966  Sorenson et al.......................... 73/114

FOREIGN PATENTS OR APPLICATIONS
764,857  1/1957  Great Britain........................ 73/113

*Primary Examiner*—Richard C. Queisser
*Assistant Examiner*—Stephen A. Kreitman
*Attorney, Agent, or Firm*—Michael S. Striker

[57] ABSTRACT

Electric signals, corresponding to two or more engine operating parameters, such as rotational speed of the engine drive shaft and the setting of the throttle valve or a rotational speed and the pressure in the intake manifold or the pressure in the intake manifold and the setting of the throttle valve, are obtained by transducers, these signals being fed to an evaluating circuit that produces an electric output that is conducted to a meter that reads fuel consumption in unit distance, or unit time, travelled.

24 Claims, 6 Drawing Figures

INVENTORS
Günther BAUMANN
Peter SCHMIDT
Hermann EISELE
Josef WAHL

By *Michael P. Shuler* their ATTORNEY

ELECTRONIC FUEL CONSUMPTION METER

BACKGROUND OF THE INVENTION

The invention relates to an arrangement for continuously measuring and showing the fuel consumption of an internal combustion engine.

As a rule, the amount of fuel consumed by an internal combustion engine is easily determined by measuring the quantity of fuel used over a determined period of time, and then, in the case of a motor vehicle, dividing the distance travelled by this quantity of fuel or, in the case of a stationary engine, dividing the quantity of fuel by the time period. It is, however, of very great advantage to be able to show the momentary fuel consumption continuously on a meter. The driver then knows, for example, immediately how he must change his driving in order to reduce the fuel consumption. If the driver only knows how much fuel is being consumed over rather long periods of time, he is not able to alter his driving with a view to reducing unnecessary consumption of fuel.

SUMMARY OF THE INVENTION

An object of the invention is an arrangement for continuously measuring and showing the consumption of fuel of an internal combustion engine without measuring the actual flow of fuel to the cylinders.

The invention consists essentially of transducer means for converting at least two engine operating parameters related to fuel consumption into corresponding electric signals, an evaluating circuit connected to the transducer means to receive as input the corresponding electric signals for providing an electric output signal indicative of fuel consumption, and meter means connected to receive as input the output signal for visually showing the fuel consumption of the engine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
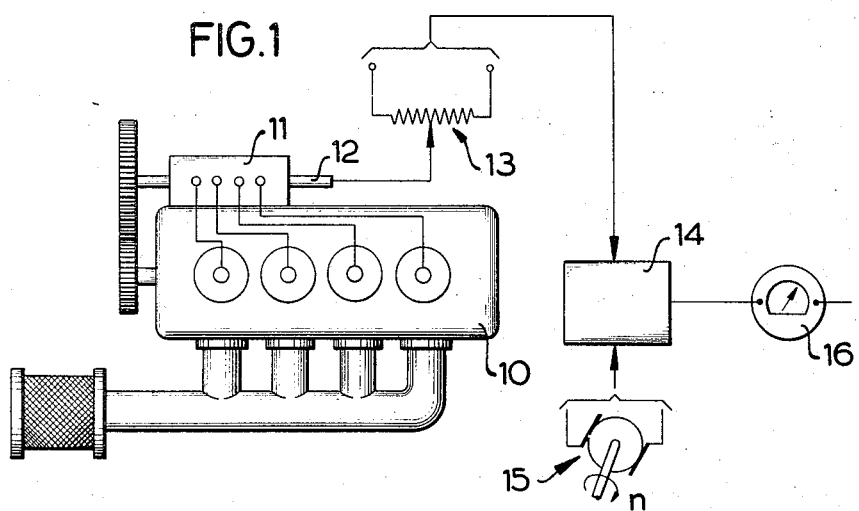
FIG. 1 schematically shows one embodiment of the invention.

With reference to FIG. 1, a particularly simple embodiment of the invention is possible when the internal combustion engine incorporates mechanical fuel injection. In this case — assuming that the engine is in a motor vehicle — the position of the arrangement for controlling the amount of fuel consumed, the position of a control rod, for example, is a measure of the fuel consumed per unit distance, or per unit time, travelled.

An internal combustion engine 10 is provided with fuel by a fuel injection pump 11. The fuel injection pump 11 comprises a control rod 12 for controlling the amount of fuel injected, the position of this rod being converted into a corresponding electric signal by a potentiometer 13, this signal being conducted to an evaluating circuit 14. The second electric input to the circuit 14 represents rotational speed, the signal being provided by a tacho generator 15. From these two electric signal inputs the evaluation circuit 14 delivers an electric signal corresponding to the instantaneous fuel consumption that is indicated by the meter 16. The rotational speed, which is represented by n, can either be the rotational speed of the drive shaft of the internal combustion engine 10 or, in the case of a motor car, the rotational speed of the driven wheels. The rotational speed n and the position of the control rod 12 can be replaced by any two other engine operating parameters that influence fuel consumption, provided that there is used a suitable evaluation circuit 14: for example, the rotational speed n and the pressure in the intake manifold; the rotational speed n and the position of the throttle valve; or the pressure in the intake manifold and the position of the throttle valve, these parameters being converted into corresponding electric signals.

Figure 2:
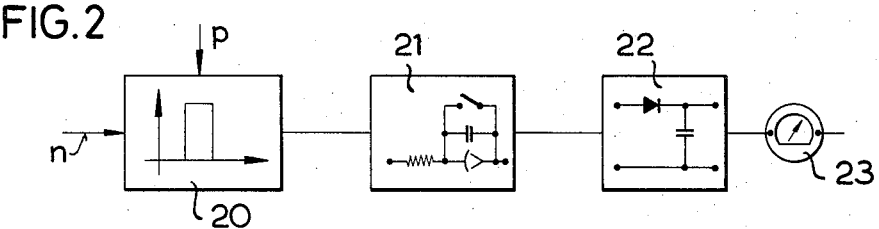
FIGS. 2, 3 and 4 are block diagrams showing three different embodiments of the evaluating circuit.
Figure 3:
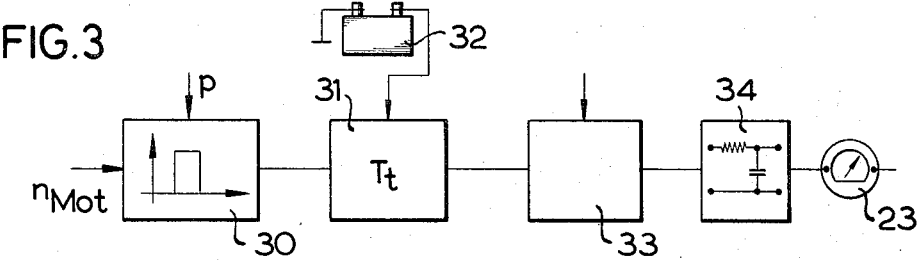

FIGS. 2 and 3 are block diagrams showing two embodiments of the evaluating circuit. In FIG. 2, the evaluating circuit comprises a pulse generator 20, the output pulses of which are influenced in dependence on two electric signals corresponding to respective operating parameters, namely a rotational speed $n$ and a pressure $p$. For example, the pulse repetition rate of the generator 20 is influenced in dependence on $n$, and the width of each pulse is influenced in dependence on $p$. The output of the pulse generator 20 is conducted to the input of an integrator 21, the output voltage of which is influenced both by the height and the width of the pulses from the generator 20. To insure that the voltage output of the integrator 21 is able to follow quickly changing values at the input, the integrator, for each new pulse, begins to integrate from zero volts. This property is symbolized by a switch connected in parallel with the integrating capacitor of the integrator. The value (height) of the output voltage of the integrator is a measure of the amount of fuel consumed. The integrator output is fed to the input of a peak value rectifier 22 of which the output is connected to a meter 23.

In accordance with the invention, the pulse repetition rate and the pulse width can be varied in dependence on the other aforementioned engine operating parameters. Further, in accordance with the invention, these parameters can be used to vary the pulse repetition rate and pulse height or pulse height and pulse width.

FIG. 3 illustrates an embodiment that is particularly suitable for motor vehicles having electronic fuel injection. This embodiment comprises a monostable multivibrator 30, which is triggered from its stable state to its unstable state in synchronism with the rotation of the drive shaft of the internal combustion engine or of the driven wheels of a motor vehicle. The monostable multivibrator delivers a pulse each time that it is in its unstable state, the duration of the pulse being influenced by the parameter $p$, which represents the pressure in the intake system of the engine. The multivibrator 30 and the multivibrator (in the control circuit of the electronic fuel injection arrangement) that opens the electromagnetic fuel injection valves while in the unstable state are one and the same. Since the length of the open time of the fuel injection spray valves is dependent on the value of the battery voltage that is fed to the spray valves, the output pulses of the monostable multivibrator 30 are conducted to a dead time, or correction, stage 31. The output pulses of the monostable multivibrator are shortened in the dead time stage 31 a dead time $T_t$, which compensates for the influence of the voltage dependent response time of the electromagnetic valve. To show that the dead time is dependent on the value of the battery voltage, there is shown a battery 32, the voltage of which is also connected to the dead time stage 31. The pulses appearing at the output of the dead time stage 31 consequently correspond exactly to the open times of the electromagnetic fuel injection valves. The open time of the fuel injection valves is a measure for the amount of fuel supplied to the engine at any given moment. In order to obtain therefrom a measure of the fuel consumed, a multiplier 33 converts the value represented by the train of pulses into a reference value. There appears at the output of the multiplier 33 a pulse train, the length of each pulse being dependent on the pressure $p$ in the intake system of the engine, and the height of each pulse being dependent on the reference value. The reference value can be a unit time or a unit distance travelled. An averaging stage 34, connected to the output of the multiplier 33, provides an electric signal suitable for the meter 23. It is advisable to introduce the reference value, because the monostable multivibrator 30 is always operated at the speed of the engine, since it is a part of the electronic control circuit for the fuel injection arrangement. The reading of the meter 23 is valid only for a fixed transmission ratio between the rotational speed of the drive arrangement and the rotational speed of the driven wheels of the vehicle. If, however, the vehicle is provided with fluid drive, there is no fixed transmission ratio between the two rotational speeds.

Figure 4:
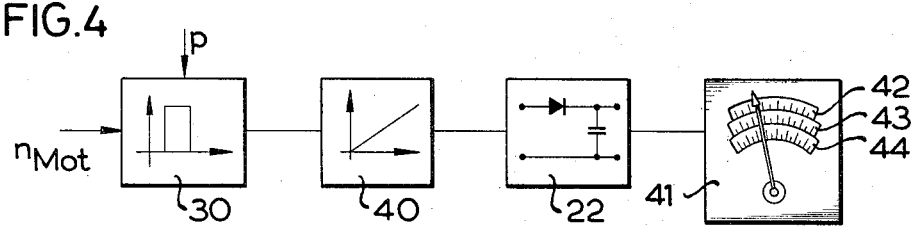

FIG. 4 shows a simplified evaluating circuit for a motor vehicle having electronic fuel injection and no automatic drive. Each gear of the gear transmission has a fixed transmission ratio between the engine and the drive. This embodiment also comprises the monostable multivibrator 30, which also determines the open time of the fuel injection spray valves of the electronic fuel injection arrangement. With a fixed transmission ratio, the width of each fuel injection pulse corresponds, aside from the error introduced by the reaction time of the electromagnetic injection valves, to the amount of fuel consumed. To measure the width of each output pulse of the monostable multivibrator 30, there is used a saw tooth generator 40 of which the output voltage at the beginning of each pulse rises from zero at a constant slope. Consequently, the value of the output voltage of the saw tooth generator reached at the end of a pulse from the generator 30 is a measure of the width of that pulse. This peak value of the saw tooth generator output is conducted to a peak value rectifier 22, where it is retained. The output of the peak value rectifier 22 is fed to a meter 41 having three scales 42, 43, and 44 off which the fuel consumed per unit distance travelled can be read for each fixed transmission ratio gear.

The fuel consumption is more easily read from the meter if the evaluation circuit comprises switch means for each of the gears, so that a single scale suffices for all of the gears. In a still further embodiment, the switching means of the evaluation circuit can be omitted by using as the reference value not the rotational speed of the drive shaft of the engine but the rotational speed of the driven wheels of the vehicle.

Figure 5:
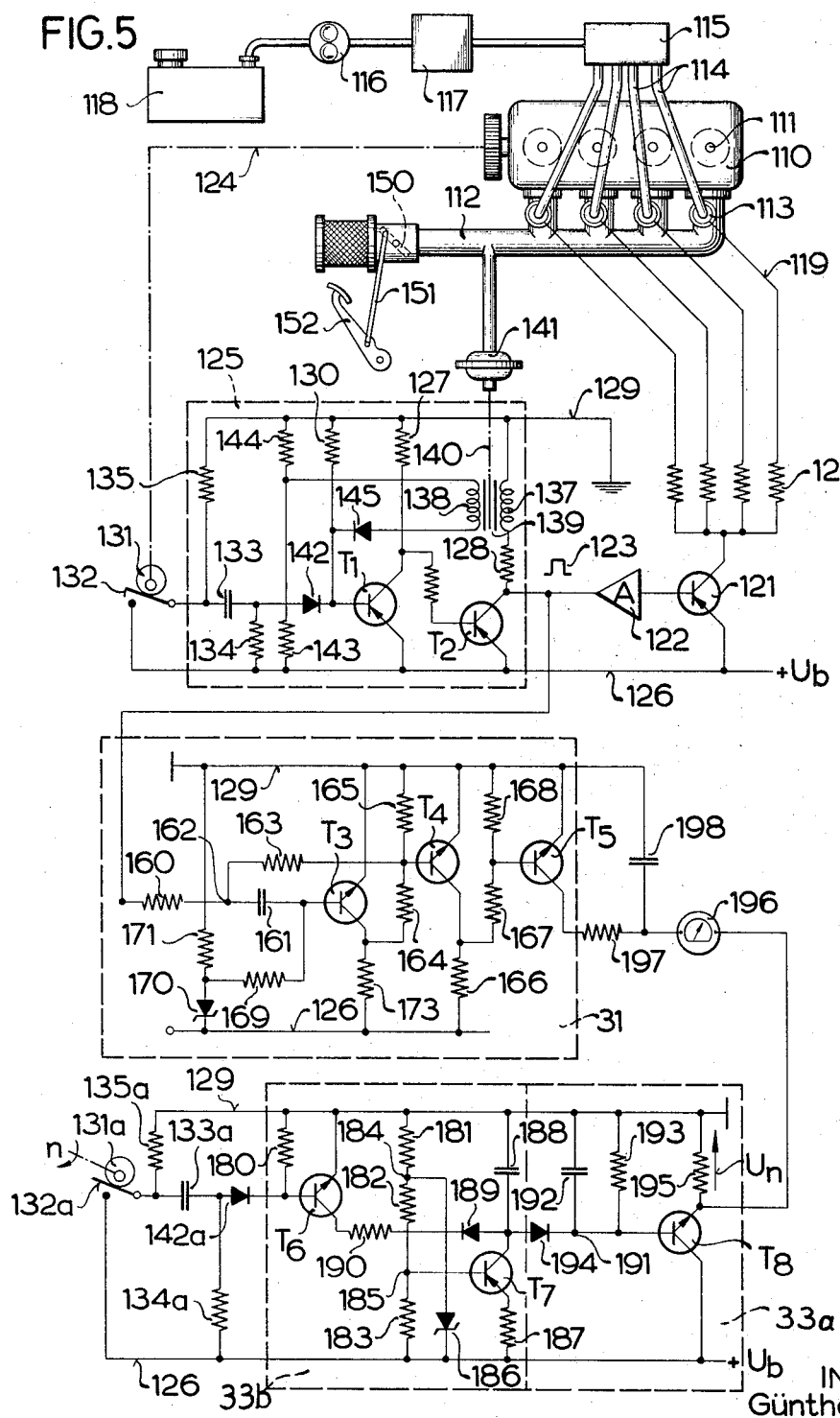
FIG. 5 is a wiring diagram of still another embodiment of the evaluating circuit of the invention.

FIG. 5 shows the wiring diagram of the evaluation circuit of a fuel consumption meter that is intended for an engine having electronic fuel injection. The amount of fuel injected is controlled by a control circuit 125, which in part is greatly simplified in FIG. 5, having two transistors $T_1$ and $T_2$ of a monostable multivibrator.

The fuel injection arrangement shown in FIG. 5 is intended to operate a four cylinder internal combustion engine 110 of a motor vehicle, the spark plugs 111 of the engine being connected to a high voltage source, not shown. A respective electromagnetic fuel injection spray valve 113 is mounted next to the engine inlet valve (not shown) on each of the branches of the intake manifold 112. Each fuel injection spray valve is supplied with fuel by a line 114 from a fuel distributor 115. A fuel pump 116, driven by an electric motor, sucks fuel from a tank 118 and supplies it to a pressure regulator 117, which keeps the fuel upstream of the injection valves 113 at a practically constant pressure of two atmospheres.

Each of the fuel injection spray valves 113 incorporates a magnet winding (not shown), one end of which is connected to ground and the other end of which is connected by a respective lead 119 to one of the four resistors 120. The resistors 120 are connected in common to the collector of a power transistor 121. The control circuit 125, which will be described, supplies the power transistor, by way of the transistor amplifier 122, with rectangular control pulses 123 during each rotation of the engine crank shaft 124, these pulses turning on the power transistor 121 so that the injection valves 113 are supplied with current during the interval of these pulses. The amount of fuel injected into the cylinder is proportional to the open time of the injection valves during each injection cycle, and must be suited to the instantaneous operating conditions of the engine.

The control circuit 125, which is enclosed within the broken line box, essentially consists of a monostable multivibrator having the transistors T1 and T2. The emitter of each transistor is connected by a positive rail 126 to the positive terminal of the vehicle battery (not shown) having a nominal voltage of 12.6 volts. Respective load resistors 127 and 128 connect the collector of each transistor to a common grounded rail 129, which is connected to the negative terminal of the vehicle battery.

In the stable state of the multivibrator the transistor T1 is kept conductive by a resistor 130, connected between the base of the transistor and the grounded rail 129. The transistor T2 is cut off. The unstable state of the multivibrator determines the length of time that the valves 113 are open. The multivibrator is triggered to the unstable state when the cam 131, which rotates with the crank shaft 124, pushes the contact arm 132, which is biased open by a spring, against the stationary contact, thereby connecting the negative plate of a capacitor 133 that has previously charged through the resistors 134 and 135 to the positive rail 126. Consequently, the transistor T1 is cut off, and the transistor T2 and the power transistor 121 are conductive; and the electromagnetic valves 113 open. The valves 113 close when the transistors T1 and T2 of the monostable multivibrator return to their original states.

The length of time required before the monostable multivibrator returns to its stable state depends upon the amount of inductance of the primary winding 137 connected in the collector circuit of the transistor T2, this primary winding together with the secondary winding 138 and an adjustable iron core 139 constituting a transformer. A rod 140 couples the iron core 139 to the diaphragm of a pressure box 141 connected to the intake manifold 112, the lower the absolute pressure in the intake manifold the more the iron core 139 is withdrawn from between the primary and secondary windings so as to reduce the inductance.

One end of the secondary winding 138 is connected by a diode 145 to the base of transistor T1, the other end being connected to the junction between two resistors 143 and 144 connected between the rails 126 and 129. As soon as the contact arm 132 touches the stationary contact (the transistor T1 being cut off through the diode 145), the transistor T2 can deliver current through the primary winding 137, this current increasing at a rate that is inversely proportional to the inductance and inducing in the secondary winding 138 a voltage that keeps the transistor T2 conductive irrespective of the position of the contact arm 132, this transistor remaining conductive until the current in the primary winding 137 approaches the saturation value. The voltage induced in the secondary winding 138 declines as the current in the primary winding 137 approaches the saturation current of the transistor T2 until, finally, it is so small that the bias voltage, determined by the resistors 130, 134, 143 and 144, at the base of transistor T1 dominates and causes the transistor to conduct. Once the transistor T1 conducts, the power transistor 121 is cut off and the fuel injection cycle is ended.

The pulses on the collector of transistor T2 not only serve to open the valves 113, which spray fuel under constant pressure into the branches of the intake manifold 112, but also to help to produce a value that is indicative of the fuel consumption. To this end, the pulses 123 are conducted to a dead time, or correction, stage 31. The correction stage comprises a time delay transistor T3, which is the input transistor of the stage, a summing transistor T4, and a phase reversal and amplification transistor T5. The pulses 123 are fed to the time delay transistor T3 by a series connected resistor 160 and capacitor 161. The emitter of the transistor T3 is connected to the grounded rail 129, and the collector is connected to the positive rail 126, which is connected to the positive terminal of the vehicle battery. The base of the summing transistor T4 is connected by a resistor 163 to the junction between the resistor 160 and the capacitor 161. The base of the transistor T4 is also connected by a resistor 164 to the collector of the resistor T3, and by a resistor 165 to the grounded rail 129. The emitter of the summing transistor T4 is directly connected to the grounded rail 129, and the collector is connected by a resistor 166 to the positive rail 126. Connected to the collector of the transistor T4 is a voltage divider consisting of the resistors 167 and 168 and connected to the grounded rail 129. The junction between the two resistors of this voltage divider is directly connected to the base of the phase reversal and amplification transistor T5. The emitter of this transistor is also directly connected to the grounded rail 129.

The time delay transistor T3 is normally conductive, because a resistor 169 connects the base to the anode of a Zener diode 170, the cathode of which is directly connected to the positive rail 126 and the anode of which is connected by a resistor 171 to the grounded rail 129. A resistor 173 connects the collector of the transistor T3 to the positive rail 126.

The circuit of FIG. 5 further includes a circuit 33a, 33b that provides an output voltage Un, which is inversely proportional to the rpm of a wheel of a motor vehicle. This circuit comprises a saw-tooth generator 33b and a peak voltage rectifier 33a. The operation of this circuit is controlled by a pulse generator, which has a contact breaker arm 132a and a differentiator. The contact breaker arm 132a is periodically closed by a cam 131a that rotates in time with the shaft of the speedometer, so that there is produced a series of positive pulses of which the repetition rate is proportional to the speed of the motor vehicle. The differentiator, which is connected between the negative rail 129 and the positive rail 126, consists of resistor 135a, a capacitor 133a, and a further resistor 134a, all connected in series. The output voltage of the differentiator is obtained at the junction between the capacitor 133a and the resistor 134a, and is conducted by a diode 142a to the input of the saw-tooth generator 33b.

The major part of the saw-tooth generator 33b consists of a capacitor 188, which is charged by a constant current source. The constant current source consists of a transistor T7 having an emitter-resistor 187 and a base voltage divider composed of the resistors 181, 182, and 183. The base of the transistor T7 is connected to a first tap 185 of the voltage divider, the other tap 184 of the voltage divider being connected by a Zener diode 186 to the positive rail 126. This Zener diode ensures that the voltage at the base of the transistor T7 is constant and independent of any variations in the battery voltage.

To permit quick discharging of the storage capacitor 188, there is provided a further transistor T6, the collector of which is connected by the series arrangement of a resistor 190 and of a diode 189 to the collector of the transistor T7. The base of the transistor T6 is the input of the saw-tooth generator 33b, and is therefore connected to the diode 142a. A resistor 180 connects this base to the negative rail 129.

In operation, the storage capacitor 188 is slowly charged through the constant current source composed of the transistor T7, so that the voltage at the collector of this transistor becomes linearly more and more positive. When the contact breaker arm 132a is closed, a brief voltage peak is conducted by the differentiating capacitor 133a and the diode 142a to the base of the transistor T6, causing the latter to become briefly conductive and enabling the storage capacitor 188 to discharge through the resistor 190 and the diode 189. The steep edge of the saw-tooth pulse of the saw-tooth generator 33b is thus produced by the transistor T6. The storage capacitor 188 is charged to a more and more positive voltage, the longer the interval between two successive pulses from the contact breaker arm 132a. In other words, the saw-tooth voltage is higher the lower the speed of the motor vehicle.

The peak voltage rectifier 33a changes the peak voltage of the saw-tooth pulse into a direct current voltage. To this end, there are provided in known manner a diode 194 and a capacitor 192. The capacitor 192 is connected to the input of an emitter-follower stage, composed of a transistor T8, a base resistor 193, and an emitter-resistor 195. The output voltage Un appears across the emitter-resistor. This direct current voltage is greater the greater the saw-tooth voltage of the saw-tooth generator 33b.

Since the saw-tooth voltage increases linearly with time, the output voltage Un is inversely proportional to the speed of the motor vehicle or is directly proportional to the time required to travel a determined distance. In order to obtain the amount of fuel consumed for the distance travelled, the output voltage Un must be multiplied by a further voltage that is proportional to the fuel consumption per unit time. This multiplication is accomplished by a meter 196, one terminal of which is connected to the emitter of the transistor T8 and the other terminal of which is connected by the transistor T5 in the dead time, or correction, stage 31 to the negative rail 129 in time with the stroke of the engine. The multiplication technique used is pulse width modulation, as known in analog computer technology. An RC network, composed of the capacitor 198 and the resistor 197, smooth the voltage fed to the meter 196.

In principle, the base of the transistor T5 could be connected directly to the output pulses of the control circuit, or monostable trigger, 125. In this case, however, no account would be taken of the dead time, during which the magnet windings of the fuel injection spray valves are energized but the valves have not yet opened. Consequently, the meter 196 would show a falsely high fuel consumption. The dead time, or correction, stage 31, which corrects for this dead time, operates in the following manner.

The inverting stage 31a changes the positive output pulses of the control circuit 125 into negative input pulses for the dead time, or correction, stage 31. The capacitor 161 conducts a negative voltage jump to the base of the delay transistor T3, causing the latter to be cut off. In the normal state of the circuit 31, the summing transistor T4 is conductive, beacuse the positive output voltage of the inverting stage 31a is conducted by the resistors 160 and 163 to the base of the transistor T4. The transistor T5 is non-conductive in the normal state of the circuit 31. After the inverting stage 31a delivers a negative input pulse, the summing transistor T4 remains conductive for a brief time, because the resistors 164 and 173 conduct a positive voltage to the base of this transistor. This condition lasts only so long until the capacitor 161 is again discharged and the delay transistor T3 is again conductive. When this is true, the summing transistor T4 is cut off, and the transistor T5 conducts so that the meter 196 is connected to the negative rail 129. Since the dead time stage 31 follows immediately when the monostable trigger 125 returns to the stable state, the output pulse of the stage 31 is precisely shorter than the output pulse of the monostable trigger 125 by an amount equal to the delay time of the transistor T3. With the correct value of the capacitor 161, this delay time is exactly equal to the dead time of the fuel injection spray valves.

Since the fuel is injected through the valves at constant pressure, the fuel consumption per unit time is exactly proportional to the fuel injection time and thus to the length of the output pulse of the dead time stage 31. The multiplication of the voltage that is proportional to the fuel consumption per unit time by the voltage Un that is proportional to the time per unit distance travelled is accomplished, in the manner already described, in the meter 196. The value shown by the meter 196 is proportional to the length of the output pulse of the dead time stage 31, when Un is constant, and is proportional to Un, when the length of the output pulse of stage 31 is constant, so that the desired multiplication is obtained.

Figure 6:
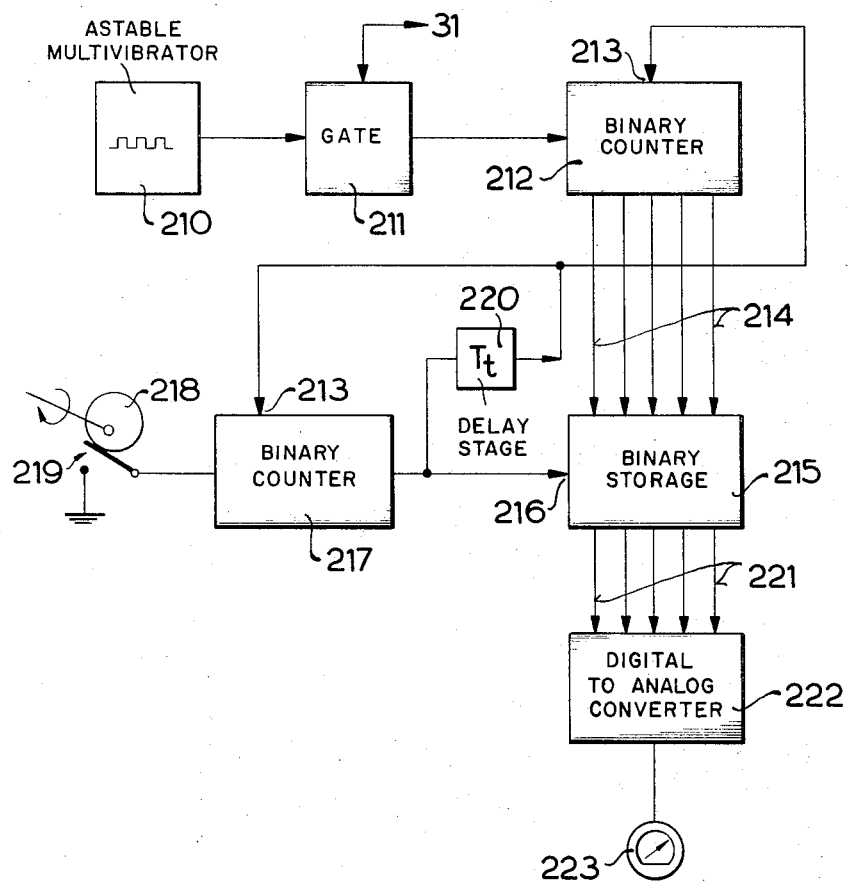
FIG. 6 schematically shows a completely digital measuring circuit.

FIG. 6 is a block diagram of a completely digital evaluation circuit that is composed of conventional digital circuit units. A constant frequency oscillator 210, such as an astable multivibrator, has a frequency that is appreciably higher than the frequency of the pulse train 123, which is present in corrected form at the output of the correction, or dead time, stage 31. The output of the oscillator 210 is connected to one input of a gate 211, which is either opened or closed by the pulses at the output of the correction stage 31. The lengths of the pulses at the output of stage 31 are proportional to the time during which fuel is effectively injected. The output of the gate 211 is connected to the input of a first counter 212, this counter counting the pulses from the oscillator 210 while the gate 211 is open. The first counter 212 incorporates a reset input 213. The counting state of the counter 212, which latter shows in parallel a binary number, is connected, in dependence on the digit of this binary number, by multiple leads 214 to the input of a store 215. The store 215 only stores a value conducted by the leads 214 when the store receives a command at the control input 216. A second counter 217, which also incorporates a reset input 213, provides the command signal for the control input 216. The second counter 217 receives, as input, a pulse train that is proportional to the reference value of the fuel consumption measurement. The train of pulses can be obtained from a tacho generator or by a drive wheel. Means for generating the train of pulses is schematically shown as a cam, which is rotated at the speed n so as to close a switch 219 once during each rotation. The output of the second counter 217 is connected by a time delay circuit 220 to the reset inputs 213 of the counters 212 and 217. The outputs of the counter 215 are connected by multiple leads 221 to a digital to analog converter 222, the resulting analog value of the binary number in the store 215 being shown on the meter 223.

The circuit just described operates in the following manner. The correction circuit 31 keeps the gate 211 open during the time that fuel is being injected. The number of pulses from the constant frequency oscillator 210 that are conducted to the first counter 212 is always proportional to the effective period during which fuel is injected. The first counter 212 counts the number of pulses conducted to its input for a period of time that is determined by the second counter 217. The reference value to which the fuel consumption is referred is conducted through the second counter 217. Instead of using the interval between two successive reference pulses, produced by the cam and switch 218 and 219, as the reference value, a constant number of pulses is used, which number is adjustable at the second counter 217. This provision improves the accuracy of the reading of the meter 223, since the magnitude of the reference value is increased. If a signal occurs at the output of the second counter 217, there is conducted to the control input 216 of the store 215 a command signal that the counting state, conducted by the multiple leads 214, of the first counter 212 is to be stored. At the same time, the output signal of the second counter 217 is conducted to the time delay circuit 220. After the delay period Tt of the circuit 220, there appears at the output of the latter a signal that is conducted to the reset inputs 213 to reset the two counters 212 and 217 to zero. Each of the counting states stored in the store 215 is proportional to the entire injection time during the interval of the reference time, this entire injection time having been converted to a digital value by the pulses from the oscillator 210. The entire injection time thus composes the open times of the electromagnetic valves from a sum of the individual injection times. The counting stage is held in the store 215 until a command signal at the control input 216 causes the store to store the new counting state of the first counter 212. The digital to analog converter 222 converts the signal from the store 215 so that the state of the latter can be read on the meter 223. The value indicated by the meter 223, which changes after each new state is stored, remains constant between two storage cycles; in other words, the reading is unchanged for the length of time of a reference value unit, which latter is determined by the second counter 217.

It will be understood that each of the elements described above, or two or more together, may also find a useful application in other types of circuits differing from the types described above.

While the invention has been illustrated and described as embodied in electronic fuel consumption meter, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for continuously measuring and indicating the instantaneous fuel consumption of an internal combustion engine, comprising, in combination, transducer means for converting at least two engine operating parameters related to fuel consumption into corresponding electric signals; an evaluating circuit connected to said transducer means to receive as input said corresponding electric signals for providing an electric output signal indicative of fuel consumption; meter means connected to receive as input said output signal for visually showing the fuel consumption of the engine, wherein said evaluating circuit includes a constant frequency oscillator, a gate connected to receive as input the output of said oscillator, a circuit having an output for providing pulses of which the lengths correspond to the time that fuel is supplied to the engine, the output of said correction circuit being connected to said gate to control the operation of the latter so that the number of oscillator pulses passed by said gate corresponds to said time, a first counter connected to the output of said gate, said first counter having a reset input, a store connected to receive as input the output of said first counter, said store including a control input, said meter means being connected to the output of said store, to provide a visual indication of the fuel consumption rate, a pulse generator for providing pulses at a frequency proportional to engine speed, a second counter connected to receive as input the output of said pulse generator for providing a reset output pulse after a predetermined number of pulses has been received from said pulse generator, said second counter having a reset input, the output of said second counter being connected to said control input of said store.

2. An arrangement as defined in claim 1, and further including a digital to analog converter connected to receive as input the output of said store, and wherein said meter means is connected to the output of said store through the intermediary of said converter so that said meter means provides an analog indication of the fuel consumption rate.

3. An arrangement as defined in claim 1, and further including a time delay circuit connected between the output of said second counter and the reset inputs of the first and second counters, so that a reset output pulse from said second counter resets both said first and second counters after a delay period determined by said time delay circuit.

4. An arrangement for continuously measuring and indicating the instantaneous fuel consumption of an internal combustion engine, comprising, in combination, transducer means for converting at least two engine operating parameters related to fuel consumption into corresponding electric signals; an evaluating circuit connected to said transducer means to receive as input said corresponding electric signals for providing an electric output signal indicative of fuel consumption; and meter means connected to receive as input said output signal for visually showing the fuel consumption of the engine, wherein said evaluating circuit includes a pulse generator for generating pulses of which at least two characteristics are varied in dependence upon said corresponding electrical signals, wherein said pulse generator is a monostable multivibrator, said evaluating circuit further including means for triggering said monostable multivibrator to the unstable state in synchronism with the rotation of the engine drive shaft, and further wherein said transducer means controls the width of said pulses.

5. The arrangement as defined in claim 4, including electronic fuel injection control means, said control means at least in part comprising said evaluating circuit.

6. The arrangement as defined in claim 5, wherein said monostable multivibrator is specific to said evaluating circuit.

7. The arrangement as defined in claim 5, as used in a motor vehicle, wherein said meter means has a plurality of scales, one for each constant transmission ratio of the engine, for showing the fuel consumption per unit distance travelled.

8. The arrangement as defined in claim 5, as used in a motor vehicle, wherein said meter means has a single scale, and wherein said evaluating circuit includes means for switching for each gear so as to show on said single scale the fuel consumption in each gear.

9. The arrangement as defined in claim 7, wherein one engine operating parameter is the rotational speed of the drive shaft.

10. The arrangement as defined in claim 7, wherein one engine operating parameter is the rotational speed of the driven wheels.

11. The arrangement as defined in claim 8, wherein one engine operating parameter is the rotational speed of the drive shaft.

12. The arrangement as defined in claim 8, wherein one engine operating parameter is the rotational speed of the driven wheels.

13. The arrangement as defined in claim 9, further including a fuel injection pump, said fuel injection pump having a control rod for varying, in dependence on the position thereof, the amount of fuel injected, and wherein one engine operating parameter is the position of said control rod.

14. The arrangement as defined in claim 10, further including a fuel injection pump, said fuel injection pump having a control rod for varying, in dependence on the position thereof, the amount of fuel injected, and wherein one engine operating parameter is the position of said control rod.

15. The arrangement as defined in claim 11, further including a fuel injection pump, said fuel injection pump having a control rod for varying, in dependence on the position thereof, the amount of fuel injected, and wherein one engine operating parameter is the position of said control rod.

16. The arrangement as defined in claim 12, further including a fuel injection pump, said fuel injection pump having a control rod for varying, in dependence on the position thereof, the amount of fuel injected, and wherein one engine operating parameter is the position of said control rod.

17. An arrangement for continuously measuring and indicating the instantaneous fuel consumption of an internal combustion engine, as used in a motor vehicle, comprising, in combination, transducer means for converting at least two engine operating parameters related to fuel consumption into corresponding electric signals; and evaluating circuit connected to said transducer means to receive as input said corresponding electric signals for providing an electric output signal indicative of fuel consumption; and meter means connected to receive as input said output signal for visually showing the fuel consumption of the engine, wherein said evaluating circuit includes a pulse generator for generating pulses of which at least two characteristics are varied in dependence upon said corresponding electrical signals, wherein said pulse generator is a monostable multivibrator, said evaluating circuit further including means for triggering said monostable multivibrator to the unstable state in synchronism with the rotation of the engine drive shaft, and further wherein said transducer means controls the width of said pulses, further including electronic fuel injection control means and electromagnetic fuel injection spray valves, said electronic fuel injection control means including a monostable multivibrator for controlling in dependence on said engine operating parameters the opening times of said electromagnetic fuel injection spray valves, and wherein said monostable multivibrator is also said pulse generator of said evaluating circuit, further including a correction circuit connected to receive as input the pulse output of said monostable multivibrator for providing, as output, pulses shortened, with respect to the multivibrator pulse output, an amount corresponding to the reaction times of said electromagnetic fuel injection spray valves.

18. The arrangement as defined in claim 17, further including an inverting stage connected to the output of said monostable multivibrator, and wherein said correction circuit includes a normally conductive delay transistor connected to receive as input the pulse output of said inverting stage, a charging circuit connected in the base current path of said delay transistor for cutting off the latter an amount of time equal to the reaction time of the fuel injection spray valves, a normally conductive summing transistor connected to receive as input the output of said inverting stage and of said delay transistor for being non-conductive when said delay transistor is conductive while an output pulse is present from said inverting stage, and an output transistor connected to receive as input the output of said summing transistor for being conductive when the latter is non-conductive.

19. The arrangement as defined in claim 17, further including circuit means for providing a voltage that is proportional to the time per unit distance travelled.

20. The arrangement as defined in claim 19, further including means for generating reference pulses related to the speed of the vehicle, and wherein said circuit means includes a saw-tooth generator connected to receive as input said reference pulses, said saw-tooth generator generating a saw-tooth pulse for each reference pulse, said saw-tooth pulse having a peak value that is directly proportional to the time per unit distance travelled, said circuit means further including a peak voltage rectifier connected to receive as input the saw-tooth pulses for changing the peak voltages of the latter into a direct current voltage that is proportional to the time per unit distance travelled, said direct current voltage being the output voltage of said circuit means.

21. The arrangement as defined in claim 20, wherein said saw-tooth generator includes a constant current source and a capacitor, said capacitor being connected to said constant current source to be charged by the latter.

22. The arrangement as defined in claim 20, wherein said meter means is connected to the output of said circuit means and to the output of said correction circuit to be connected by the latter to the polarity necessary to complete a circuit through said meter means and for a time that is directly proportional to the length of time that fuel is injected during each injection.

23. In a vehicle, in combination with an internal combustion engine provided with an electromagnetic fuel injection valve for injecting fuel into an engine cylinder, an arrangement for determining and indicating the rate of fuel consumption per predetermined number of engine revolutions comprising, in combination, signal generating means for generating a first signal indicative of the rate of fuel consumption, said signal generating means comprising electronic fuel injection control means including a monostable multivibrator connected to said electromagnetic fuel injection valve and operative for controlling the opening and closing of the latter in dependence upon predetermined engine operating conditions by applying to said electromagnetic fuel injection valve a train of valve-opening pulses of variable pulse duration for opening said valve for time durations corresponding to the time durations of said valve-opening pulses, said train of valve-opening pulses constituting said first signal, and said signal generating means further including means for generating a second signal indicative of the number of rotations of said engine per unit time; and signal processing means connected to said signal generating means and operative for receiving said first and second signals and generating an output signal indicative of the rate of fuel consumption per predetermined number of engine revolutions, said signal processing means including integrating means, and said signal processing means comprising means for applying to said integrating means a train of pulses corresponding in pulse duration to said train of valve-opening pulses, said integrating means comprising means for integrating said train of pulses corresponding in pulse duration to said train of valve-opening pulses to develop an electrical output signal dependent upon the sum of the time durations of successive openings of said fuel injection valve, to thereby develop an electrical signal dependent upon the total quantity of fuel injected by said fuel injection valve during such plurality of successive openings of said fuel injection valve.

24. A combination as defined in claim 23, wherein said integrating means comprises means operative for generating a signal proportional to the time integral of the product of said first and second signals.

* * * * *